July 1, 1924.
J. H. LACY
1,499,377
AUTOMOBILE BRAKE GUARD
Filed Nov. 4, 1922
2 Sheets-Sheet 1
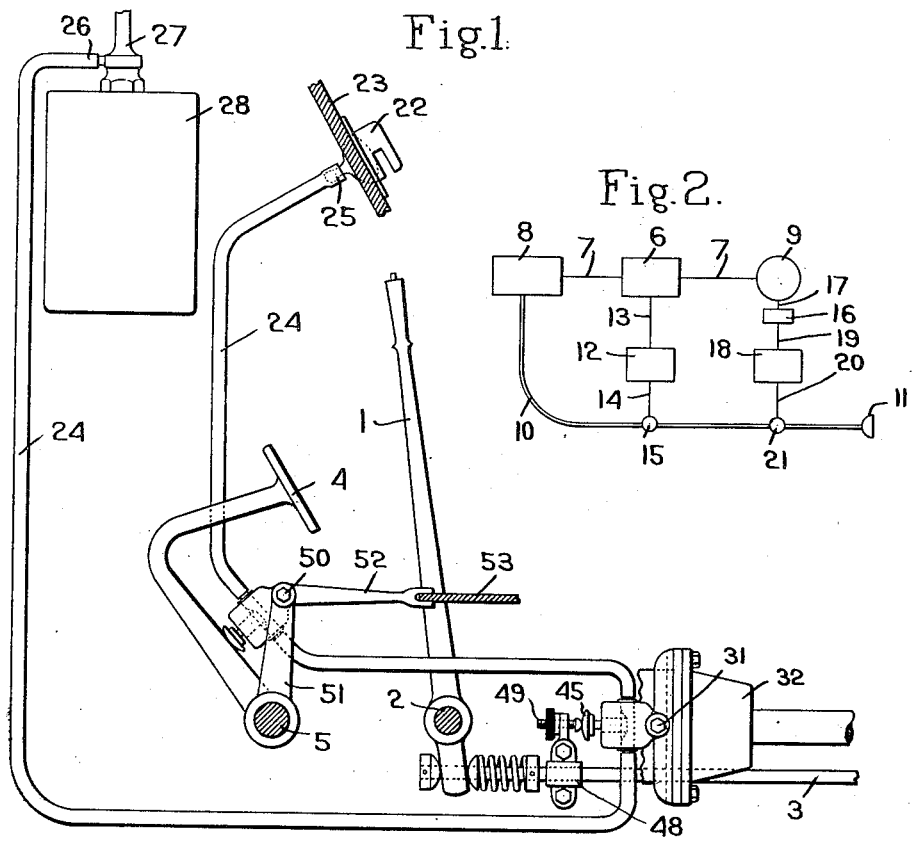
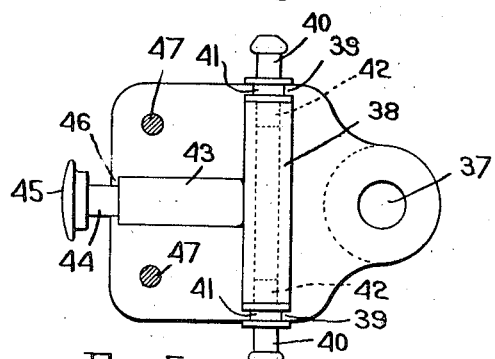
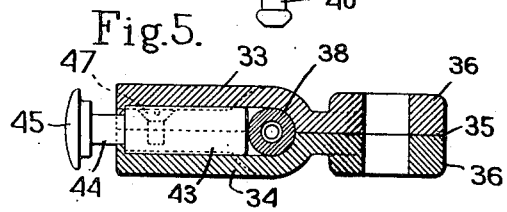
Inventor.
John H. Lacy
by Heard Smith & Tennant
Attys.

July 1, 1924.
J. H. LACY
1,499,377
AUTOMOBILE BRAKE GUARD
Filed Nov. 4, 1922
2 Sheets-Sheet 2
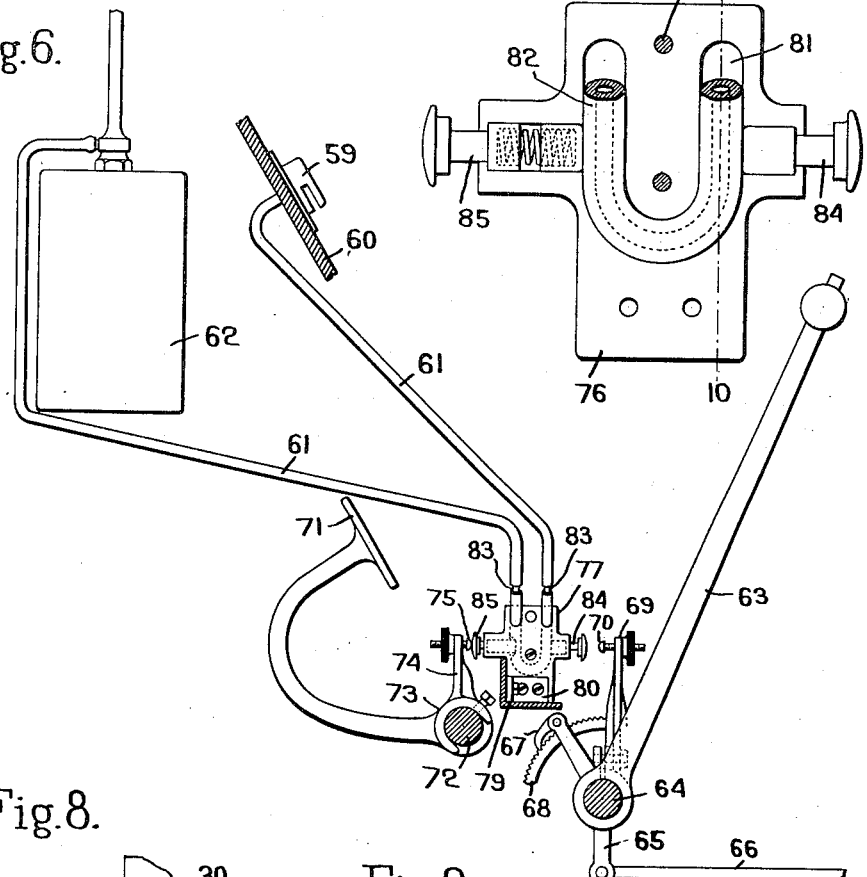
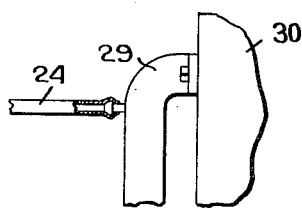
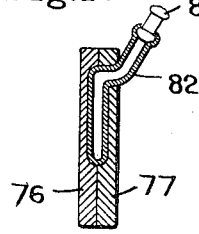
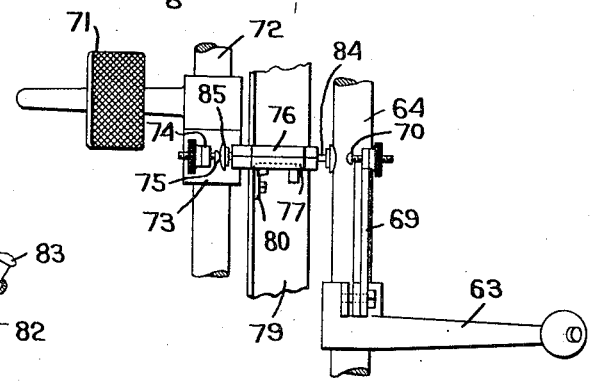
Inventor.
John H. Lacy
by Heard Smith & Tennant
Attys.

Patented July 1, 1924.

1,499,377

UNITED STATES PATENT OFFICE.

JOHN HOWARD LACY, OF BOSTON, MASSACHUSETTS.

AUTOMOBILE BRAKE GUARD.

Application filed November 4, 1922. Serial No. 599,030.

*To all whom it may concern:*

Be it known that I, JOHN HOWARD LACY, a citizen of the United States, and resident of Boston, county of Suffolk, and State of Massachusetts, have invented an Improvement in Automobile Brake Guards, of which the following description, in connection with the accompanying drawing, is a specification, like characters on the drawing representing like parts.

This invention relates to, and has for its object the provision of, means for guarding the brake of an automobile or similar machine so as to prevent the starting thereof with the brake wholly or partially applied.

It is a common experience with operators of automobiles to start or attempt to start the automobile with a brake such as the emergency brake applied or in locking position. This is obviously undesirable resulting in undue strain upon the engine and upon the mechanism of the vehicle and producing excessive wear upon the brake mechanism.

In my co-pending application, Serial No. 543,587, filed March 14, 1922, there is illustrated and described a form of apparatus for preventing this occurrence involving in its specific adaptation a pneumatically actuated audible signal.

The object of the present invention is to provide another form, and in many respects an improved form, of mechanism for securing the same general result.

The object of the present invention is further to provide a simple and efficient form of apparatus which may readily be attached to existing automobile or similar machines.

These and other objects and features of the invention will appear more fully from the accompanying description and drawings and will be particularly pointed out in the claims.

In the drawings;

Fig. 1 is a side elevation of the main portions of a preferred form of apparatus embodying the invention;

Fig. 2 is a diagrammatic illustration of the main elements involved in the apparatus;

Fig. 3 is an inside view of a valve casing or one of the casing parts with the valve device and plunger in position;

Fig. 4 is a view similar to Fig. 3 with the valve device shown in cross section and with a two part plunger in place;

Fig. 5 is a view in transverse cross section of the complete casing part of which is shown in Fig. 3;

Fig. 6 is a view similar to Fig. 1 showing a different form and adaptation of the invention;

Fig. 7 is an inside view of one of the parts of the casing shown in Fig. 6 with the valve device and plungers in position;

Fig. 8 is a detail showing a manifold connection;

Fig. 9 is a plan view of certain of the parts shown in Fig. 6;

Fig. 10 is a view in vertical cross section taken on the line 10—10 of Fig. 7.

Since the invention is adaptable to a wide range of machines, such for example as automobiles, and is not concerned with any of the mechanism of the automobile or vehicle other than those parts with which it is directly associated it is unnecessary to illustrate or describe in detail the mechanism of the machine or automobile.

In Fig. 1 a brake actuator is shown in the form of the ordinary emergency brake of an automobile comprising an upstanding arm or lever 1 fulcrumed at 2 and engaging a longitudinally movable brake rod 3 which extends back to the brake mechanism.

In the form illustrated it is assumed that a movement of the arm 1 from the position shown in Fig. 1 to the right will apply the brake mechanism while a movement in the opposite direction will release the brake mechanism and this arm 1 is shown in Fig. 1 in the position it assumes when the brake is released.

The construction shown in Fig. 1 also includes a connection actuator shown in the form of the usual clutch pedal 4 connected to a horizontally rotatable shaft 5. This is illustrated as of the ordinary type adapted to control the clutch which connects and disconnects the engine or motor to the driving elements or wheels such as the rear wheels of the automobile.

In the construction illustrated it is assumed that when the clutch pedal 4 is in the position shown the clutch will be actuated to connect the engine to the driving shaft or driving wheels and when the clutch pedal is moved toward the left the clutch will be disconnected.

It is to be understood, of course, that there may be other and additional means for effecting the connection and disconnection of the engine to the driving elements, such for instance as the usual transmission mechanism. The invention in fact is to be considered as utilizing any connection actuator which is movable to effect the connection and disconnection of the engine to the driving elements.

The present invention provides a pneumatically actuated normally inactive signal preferably in the form of a whistle which is actuated preferably by or through the engine but is controlled independently by the brake actuator and the connection actuator so that if the brake is not properly released before the automobile is started the signal will be actuated.

The generic plan of the apparatus is diagrammatically illustrated in Fig. 2 wherein the clutch, transmission or other connecting and disconnecting mechanism 6 is illustrated as interposed in the driving connection 7 between the engine 8 and the wheels or driven elements 9. A pipe 10 extending from the engine to a signal 11 indicates the means for operating the signal by or through the engine. The clutch actuator 12 is connected at 13 to the clutch or transmission mechanism and at 14 to a valve device 15 in the tube 10. A brake mechanism is connected at 17 to the driven elements 9. A brake actuator 18 is connected at 19 to the brake mechanism and at 20 to a valve device 21 in the pipe 10.

In the construction illustrated the signal is in the form of pneumatically actuated but normally inactive whistle 22 which may be mounted at any desired position and is shown as mounted on the dash board 23. This signal is actuated by inducing a flow of air in a pipe connected to the signal and extending to some suitable means for inducing the flow of air. For this purpose either the exhaust of the engine or the usual vacuum tank found in an automobile may be employed. In Fig. 1 the pipe 24 is in the form of a rubber tube connected at one end 25 to the signal and extending through valve devices hereinafter described and connected at the other end 26 to the suction pipe 27 of the vacuum tank 28. In Fig. 8 an alternative form is shown wherein the pipe 24 is connected to the exhaust manifold 29 leading from the engine 30. In either form the action of the means for inducing the flow of air in the pipe 24 is to produce suction and the whistle 22 is therefore constructed to operate by suction but it is to be understood that the invention is not to be limited to the particular direction in which the signal inducing flow of air takes place in the pipe.

In the construction illustrated in Fig. 1, as in my aforementioned application, No. 543,587, the flow of air in the pipe 24 is independently controlled at two points by the connection actuator and by the brake actuator. The valve device by which this control is effected may be located at any convenient point or points in the pipe, usually depending upon the construction of the automobile or device to which the invention is applied. In Fig. 1 these two valve devices are shown as mounted in the pipe at points considerably separated from each other and each valve device is provided with a separate casing. These casings are shown as of similar construction.

The casing containing the valve device controlled by the brake actuator is shown in Fig. 1 as conveniently secured by a bolt 31 to a transmission casing 32. This casing is shown in Figs. 3 and 5 and comprises two similar flat co-operating parts 33 and 34. These parts have flat opposing surfaces fitting together at 35. At one end each part is provided with a boss 36 through the aligned openings 37 in which is mounted the bolt 31. A conduit is provided through the valve casing by forming in each part a semicylindrical cavity extending transversely of the casing. In this cavity is mounted an elastic compressible cylindrical pipe section shown as a short piece of heavy rubber tubing 38. In the construction shown in Figs. 3 and 5 complementary semiannular walls 39 are formed on each casing part at each end of the conduit in which the tube 38 is located. Nipples 40 provided with exterior annular grooves 41 are mounted at each end with the walls 39 fitting into the grooves 41. The inner ends 42 of these nipples fit into the tube 38 while the outer ends are connected to the main pipe 24.

A valve operating plunger is mounted between the casing parts to act against the compressible pipe section or tube 38. This plunger is shown as having a cylindrical body 43 seated between the casing parts in semicylindrical grooves formed in each part and provided with a stem 44 and a head 45 exteriorly of the casing. The annular shoulder 46 on the casing parts limits the outer movement of the plunger. The inner end of the body of the plunger abuts against the tube 38. If now the plunger be pressed inwardly it will compress the tube 38 and thus cut off the flow of air through the tube. If the plunger is released the expansive force of the tube will force the plunger to its outer position and permit the flow of air through the tube.

The casing parts of this valve device are preferably made in the form of castings and are given a suitable shape. As illustrated these parts are flat and held together by the screws 47. In line with the plunger and in line with the tube 38 the casing parts are preferably swelled outwardly so as to give substantially the same thickness of metal throughout.

The head 45 of the plunger of this valve device is controlled by the brake actuator 1. For that purpose the brake rod 3 is shown provided with a bracket 48 clamped thereto and provided at its upper end with an adjustable stop screw 49 adapted to contact with the head 45 of the plunger. The parts are so arranged that when the brake arm or lever 1 is in the position shown in Fig. 1, or in its extreme left hand position the brake mechanism is released and the brake rod 3 is held to the right forcing the stop screw 49 against the plunger head 45 and forcing the plunger against the tube 38 so as to compress the tube and cut off the flow of air through the pipe 24. Whenever the lever 1 is moved to the right or away from releasing position the brake rod 3 is thereby moved to the left and the stop screw 49 allows the plunger to move outwardly under the expansion of the tube 38 and thus permit the flow of air through the pipe 24.

The valve device casing controlled by the connection actuator such as the clutch pedal 4 is similar to that already described. The inside of this casing is shown in Fig. 4. This casing is mounted in a suitable position so that its plunger may be controlled by the clutch pedal and in the illustration is shown as mounted by a bolt 50 in a bracket one arm 51 of which fits over the shaft 5 and the other arm 52 of which fits over the edge of a flange 53 forming a part of the frame of the machine. The plunger in this device is preferably a two part plunger formed by dividing the body transversely into two recessed parts 54 and 55 between which is seated a spring 56. The elastic compressible rubber tube 57 is mounted in the casing parts in the same manner as the tube 38 and connected by the nipples 58 to the main pipe 24.

As shown in Fig. 1 when the connection actuator, or clutch pedal 4, is in the position illustrated where the driving connection is made the parts are so arranged that the clutch pedal holds the plunger forced inwardly compressing the tube 57 and cutting off the flow of air. In this position the spring 56 is compressed and the part 54 contacts with the part 55 of the plunger. This two part construction of plunger allows the clutch pedal to move away slightly from the connecting position before the flow of air is permitted through the tube 57 because during the first part of the movement of the clutch pedal the parts 54 and 55 of the plunger will separate under the action of the spring 56 and then the entire body of the plunger will move under the expansive elasticity of the tube 57.

The operation of the apparatus will be apparent from the foregoing description. Under normal running conditions the parts stand as shown in Fig. 1 with the brake actuator 1 in releasing position and the clutch actuator 4 in connecting position. Both valve devices are closed cutting off at two points the flow of air through the pipe 24. Any movement of the clutch actuator to disconnecting position while opening the valve device controlled thereby still leaves the valve device controlled by the brake actuator closed so that there is no actuation of the signal. When, however, the brake actuator is moved away from the releasing position as to apply the brake mechanism the valve device controlled thereby is immediately opened.

The starting of the automobile involves the manipulation of the connection actuator. If this is the clutch pedal as illustrated then the operator will depress the clutch pedal to permit the shifting of the transmission gears. This will at once open the valve device controlled by the clutch actuator and consequently, both valve devices being open, a free flow of air will be permitted through the pipe 24 and the signal will be actuated thus warning the operator that the brake mechanism is wholly or partially applied. If now the operator releases the brake mechanism by moving the brake actuator to releasing position the valve device controlled thereby will be closed and the signal will stop sounding.

There is thus provided a very simple efficient and readily installed mechanism for pneumatically actuating a normally inactive signal whenever an attempt is made to start the automobile with the brake mechanism wholly or partially applied.

The construction illustrated in the remaining figures of drawing operates in the same manner and upon the same principles as that already described. It involves certain alternative forms of the apparatus and shows something of the adaptability of the apparatus to a different form of automobile mechanism. In Figure 6 the pneumatic signal 59 is mounted as before on the dashboard 60 and connected by the pipe 61 with the vacuum tank 62. The brake actuator 63 is secured to a transverse shaft 64 from which depends an arm 65 connected to the brake rod 66 extending, as before, to the brake mechanism. The brake actuator is here illustrated as away from releasing position and held by a pawl 67 in engagement with a segmental rack 68. A bracket 69 is adjustably secured to and projects upwardly and laterally from the hub of the brake actuator 63 and carries at its upper end the adjustable valve operating stop screw 70.

The clutch connection actuator is again shown in the form of a clutch pedal 71 secured to the shaft 72. A bracket 73 is fitted over and secured to this shaft and provided with an arm 74 carrying at its upper end an adjustable valve operating stop screw 75. The clutch actuator is shown in its normal or connecting position.

In this construction the clutch actuator and brake actuator are shown as so arranged that both valve devices may be and are associated in a single casing. This casing is shown of the general type already illustrated comprising two complementary flat parts 76 and 77 secured together by screws 78 and inclosing the valve mechanism. This two part casing is shown as mounted in vertical position on an angle iron 79 extending transversely adjacent the shafts 64 and 72. The casing is held in position by an angle bracket 80 fastened to the face of the casing and to the vertical flange of the angle iron.

In this construction the casing parts are formed with co-operating U-shaped grooves 81 in which are mounted a piece of heavy rubber tube 82 with its ends projecting through the side wall of the casing part 77 and connected by the nipples 83 with the pipe 61. This tube 82 functions in the same manner as the two tubes 38 and 57 already described. By placing this tube in the casing in this U-shape it is prevented from being displaced and remains in position. It also affords a very simple means of manufacturing and assembling a complete double valve device. The plunger 84 compresses and releases this tube 82 to cut off and permit the flow of air under the control of the brake actuator 63 in the same manner as already described in connection with the construction shown in Figures 3 and 5. The two part plunger 85 is likewise controlled by the clutch actuator to cut off and permit the flow of air at a second point in the tube 82 in the same manner as the plunger illustrated and described in connection with Figure 4.

The general operation of the device thus shown in Figures 6, 7, 9 and 10 is similar to that already described and will be apparent from the foregoing description.

Having thus described my invention, what I claim as new and desire to secure by Letters Patent, is:

1. In an automobile a brake actuator movable to apply and release brake mechanism, a pneumatically actuated normally inactive signal, a pipe connected to the signal and having an elastic compressible section, means for inducing a flow of air in the pipe sufficient to actuate the signal, and means acting when the brake actuator is in releasing position to compress the pipe section to cut off, and when the brake actuator is absent from releasing position to relieve the pressure on the pipe section to permit, the signal actuating flow of air in the pipe.

2. In an automobile a brake actuator movable to apply and release brake mechanism, a pneumatically actuated normally inactive signal, a pipe connected to the signal and having an elastic compressible section, means operated by the engine for inducing a flow of air in the pipe sufficient to actuate the signal and means acting when the brake actuator is in releasing position to compress the pipe section to cut off, and when the brake actuator is absent from releasing position to relieve the pressure on the pipe section to permit, the signal actuating flow of air in the pipe.

3. In an automobile a brake actuator movable to apply and release brake mechanism, a connection actuator movable to effect the connection and disconnection of the engine to the driving elements, a pneumatically actuated normally inactive signal, a pipe connected to the signal and having an elastic compressible section, means for inducing a flow of air in the pipe sufficient to actuate the signal, means acting when the brake actuator is in releasing position to compress the pipe section to cut off, and when the brake actuator is absent from releasing position to relieve the pressure on the pipe section to permit the signal actuating flow of air in the pipe, and means acting when the connecting actuator is in connecting position to compress the pipe section to cut off, and when the connection actuator is in disconnecting position to relieve the pressure on the pipe section to permit, the signal actuating flow of air in the pipe, whereby the signal is actuated if an attempt is made to start the automobile with the brake wholly or partially applied.

4. In an automobile a connection actuator movable to effect the connection and disconnection of the engine to the driving elements, a pneumatically actuated normally inactive signal, a pipe connected to the signal and having an elastic compressible section, means for inducing a flow of air in the pipe sufficient to actuate the signal, and means acting when the connection actuator is in connecting position to compress the pipe section to cut off, and when the connection actuator is in disconnecting position to relieve the pressure on the pipe section to permit, the signal actuating flow of air in the pipe.

5. In an automobile a pneumatically actuated normally inactive signal, a two part casing provided with a conduit extending therethrough, means for securing together the casing parts, means for securing the casing to the automobile, a valve device mounted between the casing parts in the conduit and removable therefrom by separating the parts, a valve operating plunger mounted between the casing parts, removable therefrom by separating the parts, and protruding from the casing, a pipe connecting one end of the conduit to the signal and means for inducing a flow of air connected to the other end of the conduit.

6. In an automobile the construction defined in claim 5 in which the valve operating plunger is constructed in two transversely separated relatively movable parts and in which a spring is interposed between the plunger parts.

7. In an automobile a pneumatically actuated normally inactive signal, a two part casing having a conduit extending therethrough, means for securing together the casing parts, means for securing the casing to the automobile, an elastic compressible pipe section located in the conduit, complementary semiannular walls at each end of the conduit on each casing part, nipples provided with exterior annular grooves to fit over the annular walls, one end of each nipple connecting with the compressible pipe section and the other end serving as an exterior connection, a pipe connecting one nipple to the signal, and means connected to the other nipple for inducing a signal actuating flow of air in the conduit.

8. A valve device comprising a two part casing having a conduit extending therethrough and formed half in each casing part, means for securing together the casing parts, an elastic compressible pipe section located in the conduit, and a plunger movably mounted between the casing parts transversely of the conduit, whereby the pipe section and the plunger are readily removable and replaceable in the casing when the parts thereof are separated.

9. A valve device having the construction defined in claim 8 in which each casing part at each end of the conduit is provided with semiannular walls in combination with nipples provided with exterior annular grooves to fit between the said semiannular walls.

In testimony whereof, I have signed my name to this specification.

JOHN HOWARD LACY.